United States Patent [19]
Wing-Fai

[11] Patent Number: 5,308,236
[45] Date of Patent: May 3, 1994

[54] APPARATUS FOR FORMING NOODLE BUNDLES

[76] Inventor: Jor Wing-Fai, Flat C, 22nd Floor, Aik San Industrial Building, 14 Westlands Road, Quarry Bay, Hong Kong

[21] Appl. No.: 928,296

[22] Filed: Jul. 27, 1992

Related U.S. Application Data

[62] Division of Ser. No. 720,387, Jun. 25, 1991, Pat. No. 5,186,969.

Foreign Application Priority Data

May 9, 1990 [GB] United Kingdom ............... 9019322

[51] Int. Cl.⁵ ..................... A23L 01/00; A23P 01/00
[52] U.S. Cl. ............... 425/305.1; 242/67.1 R; 425/319; 425/323; 425/324.1; 425/391; 425/403.1
[58] Field of Search ............ 426/451, 500, 512; 53/119, 120; 425/308, 323, 324.1, 319, 305.1, 391, 301, 403.1; 242/60, 67.1 R, 100.1

[56] References Cited

U.S. PATENT DOCUMENTS

| | | | |
|---|---|---|---|
| 1,159,781 | 11/1915 | McCoy | 242/60 |
| 1,213,900 | 1/1917 | Pignone | 242/67.1 R |
| 1,579,470 | 4/1926 | Cooper | 242/67.1 R |
| 1,711,431 | 4/1929 | Surico et al. | 425/323 |
| 2,621,615 | 12/1952 | Lombardi | 426/451 |
| 3,664,594 | 5/1972 | Novak | 242/60 |
| 4,161,298 | 7/1979 | Davis | 242/67.1 R |
| 4,162,600 | 7/1979 | Westall et al. | 53/120 |
| 4,264,635 | 4/1981 | Wilde | 426/451 |
| 4,470,792 | 9/1984 | Busseniers et al. | 425/391 |
| 4,783,948 | 11/1988 | Kando | 53/119 |

*Primary Examiner*—Jay H. Woo
*Assistant Examiner*—Joseph Leyson
*Attorney, Agent, or Firm*—Sandler, Greenblum & Bernstein

[57] ABSTRACT

An apparatus for forming noodle bundles by folding strands of noodles, suspending the folded noodle strands from the apparatus at an intermediate position of the folded noodle strands and folding them again. The twice-folded noodles are then rotated by the apparatus to fold them at least once more or to roll up the doubly folded noodle strands in order to place loose ends of the noodle strands within the finally folded or rolled up noodle bundle, and subsequently removing the apparatus from the folded or rolled up noodle bundle.

9 Claims, 2 Drawing Sheets

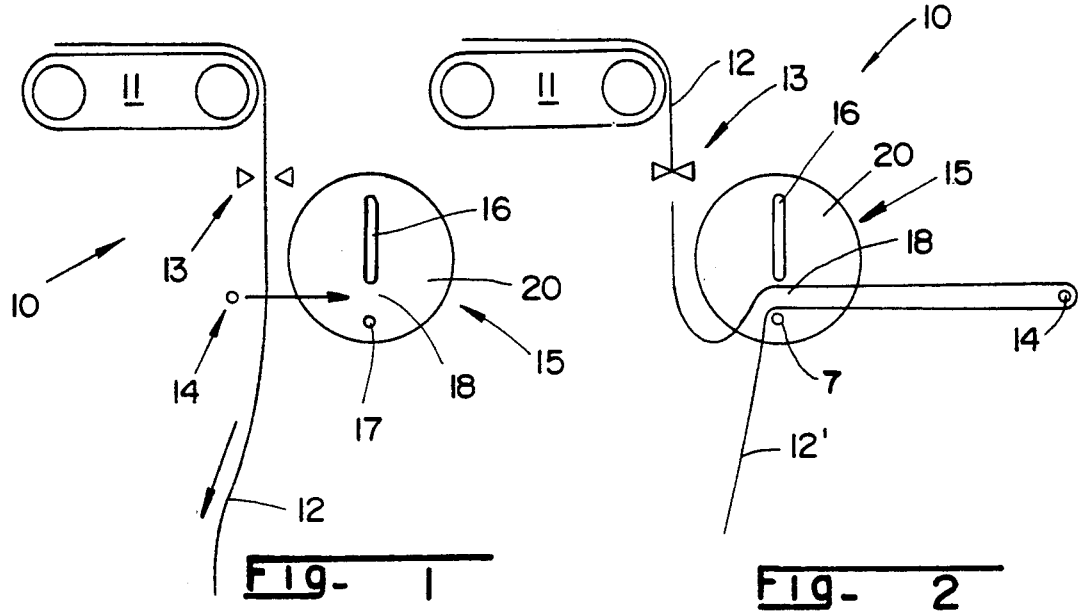
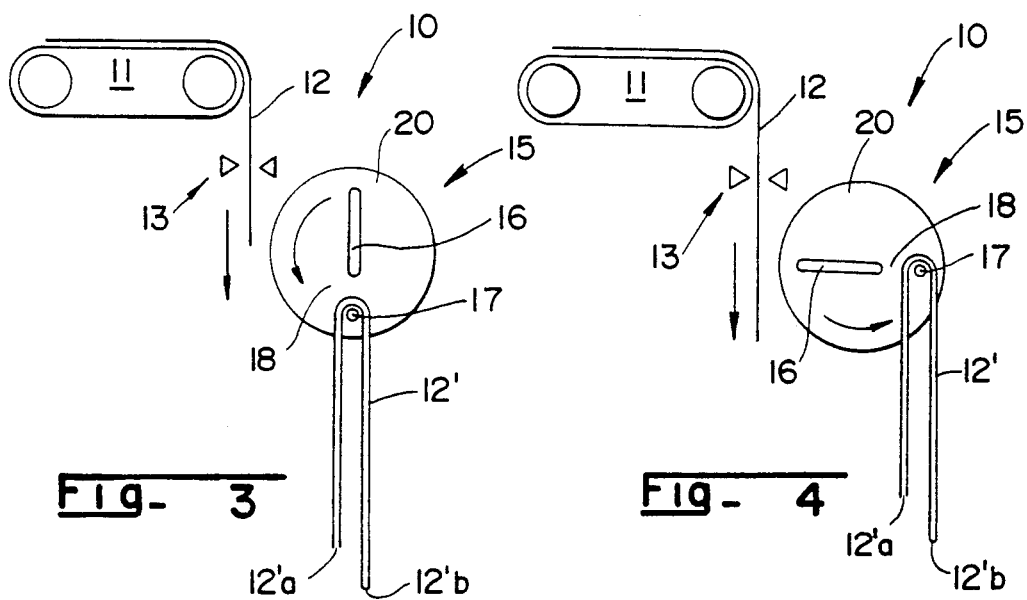
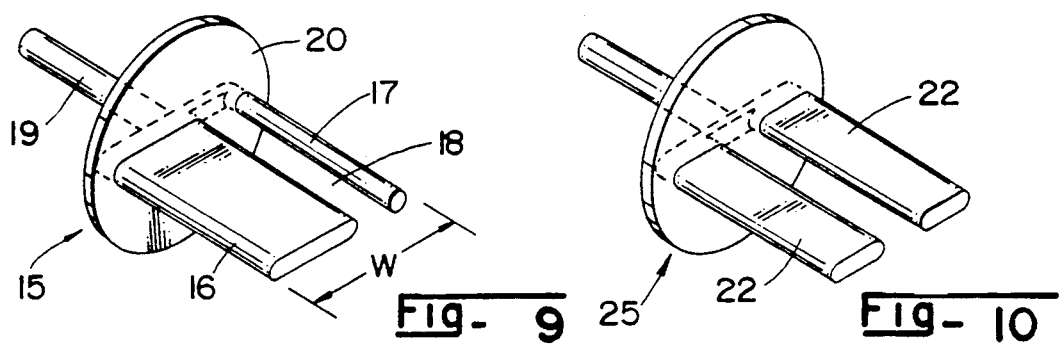

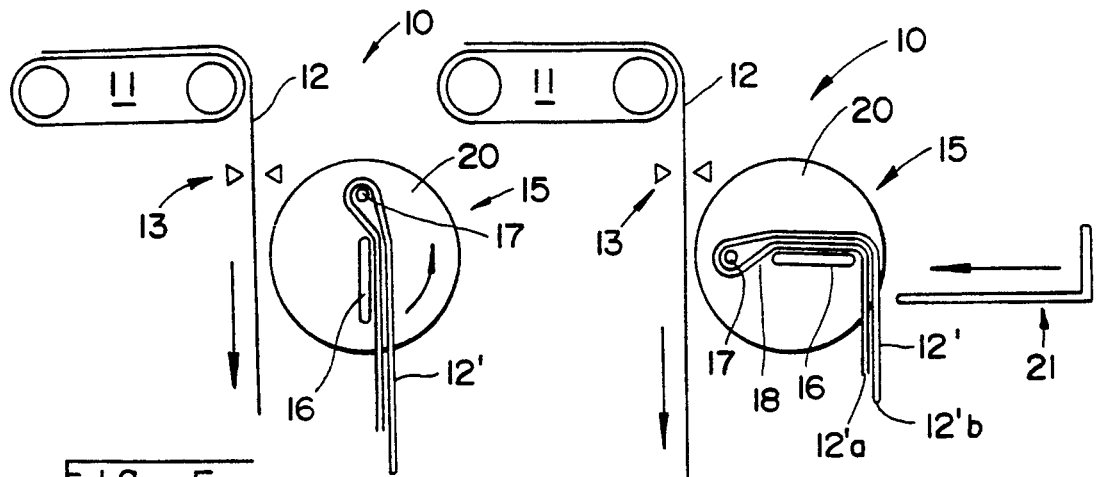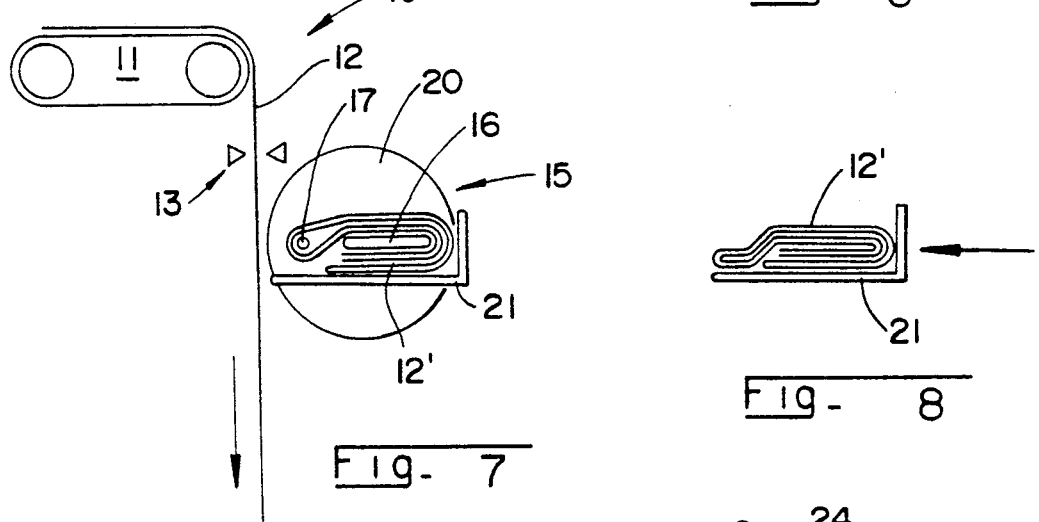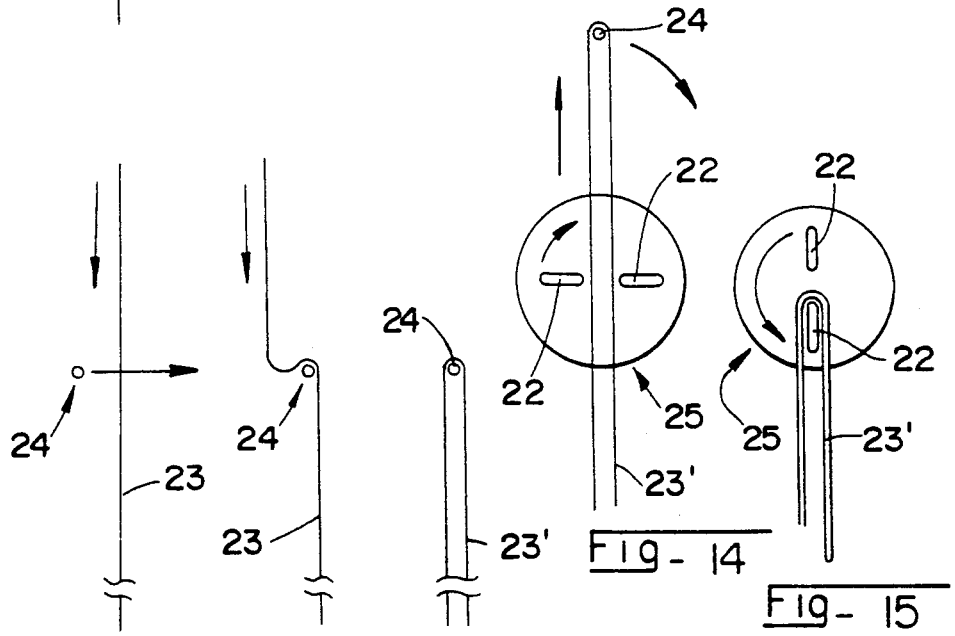

in the form of a plate and a co-planar rod.
APPARATUS FOR FORMING NOODLE BUNDLES This application is a division of application Ser. No. 07/720,387, filed Jun. 25, 1991, now U.S. Pat. No. 5,186,969.

The present invention relates to a method of forming noodle bundles and to an apparatus for forming noodle bundles according to the method.

FIELD OF THE INVENTION

Noodles are available on the market in either dry (dehydrated) or moist (not dehydrated) form. Most noodles are sold in folded or rolled up bundles, whether in bags or not, to save space and for convenient handling. The loose ends of noodle strands, either dry or moist, are more vulnerable to breaking off during handling than the rest of the noodle strands. This not only reduces the weight of the noodle bundles but also affects their appearance, particularly for dry, crispy noodle bundles packed in a bag in which the broken off noodle strands are retained.

It is known to fold or roll up noodle strands to form a bundle by hand in such a manner that the loose strands ends are located within the bundle. Whilst mass production by automatic machinery is highly desirable for efficiency, there remains the problem that the noodle strands are too fragile to be handled by machines in an economical way.

BRIEF DESCRIPTION OF THE INVENTION

The present invention seeks to solve this problem by providing a method of forming noodle bundles, which method can be carried out effectively by machines without breaking the noodle strands, and by providing apparatus for carrying out such a method.

According to a first aspect of the invention, there is provided that a method of forming noodle bundles, which method comprises firstly folding strands of said noodle, suspending from an operating device said folded noodle strands at an intermediate position of said folded noodle strands which are thereby folded again, rotating a said operating device to fold at least once more or to roll up said doubly folded noodle strands in order to place the loose ends of said noodle strands within the finally folded or rolled up noodle bundle, and subsequently removing the operating device laterally from the folded or rolled up noodle bundle.

Preferably, the strands of the noodle are firstly folded by a deflector which moves the noodle strands sidewards in order to fold the noodle strands while the latter are being suspended.

It is preferred that the strands of the noodle are firstly folded by a deflector when the former are being supplied from a source.

Preferably, the noodle strands are firstly folded substantially at a position midway between their two loose ends so that the so firstly folded noodle strands have their loose ends close together.

In a preferred embodiment, the method further comprises passing firstly folded noodle strands through an operating device so as to suspend them therefrom upon removal of a deflector.

It is preferred that a deflector moves noodle strands sidewards both to fold and to pass noodle strands through an operating device.

Advantageously, the method further comprises moving a supporting surface underneath noodle strands before an operating device is removed so as to support said noodle bundle upon removal of operating device.

Preferably, the operating device is rotated through substantially three quarters of a circle.

According to a second aspect of the invention, there is provided apparatus for forming noodle bundles according to such a method.

It is preferred that the apparatus comprises a generally flat operating device which is rotatable to fold or roll up the strands of noodle.

In a preferred embodiment, the operating device comprises two parts forming a gap therebetween, through which gap noodle strands are to pass and be suspended from one or both of the parts. Preferably, the two parts are in the form of a plate and a co-planar rod.

BRIEF DESCRIPTION OF DRAWINGS

The invention will now be more particularly described, by way of example only, with reference to the accompanying drawings, in which:

FIGS. 1 to 8 show schematically a first embodiment of a method and apparatus in accordance with the invention;

FIG. 9 is a perspective view of an operating device of the apparatus as shown in FIGS. 1 to 8;

FIG. 10 is a perspective view of a different operating device which can be used in place of the operating device of FIG. 9; and FIGS. 11 to 15 show schematically a second embodiment of a method and apparatus in accordance with the invention.

DETAILED DESCRIPTION OF PREFERRED EMBODIMENTS

Referring to FIGS. 1 to 9 of the drawings, there is shown a first embodiment of a method and apparatus 10 which includes a noodle conveyor belt 11 by means of which noodle strands 12 are fed from a noodle forming station (not shown). Round the forward end of the conveyor belt 11, the noodle strands 12 are suspended downwards through a pair of cutters 13. At a certain distance below the cutters 13, a deflector rod 14 is provided behind the suspended noodle strands 12. The apparatus 10 further comprises an operating device 15 which is provided at generally the same level as the deflector rod 14 but on the other (front) side of the suspended noodle strands 12.

As best shown in FIG. 9, the operating device 15 comprises a blade 16 and a rod 17 co-planar with the blade 16, a gap 18 therebetween. The blade 16 and rod 17 extend generally in the same direction, and are integrally connected together to a shaft 19 which extends in the same direction but rearwards and about which the blade 16 and rod 17 are to be rotated. The operating device 15 further comprises a disk 20 co-axial with the shaft 19 and through which the blade 16 and rod 17 extend forwards, whereby the disk 20 can be rotated by the blade 16 and rod 17. The arrangement is such that the blade 16 and rod 17 can be withdrawn rearwards from the disk 20 for a reason as explained below.

The initial angular position of the operating device 15 is shown in FIG. 1 in which the blade 16 is positioned vertically above the rod 17. The deflector rod 14 is initially located in alignment with the gap 18, and is movable forwards and finally passing through the gap 18.

The method of forming noodle bundles, in this particular embodiment, will now be described. Noodle strands 12 are supplied by means of the conveyor belts 11, and at a certain instant the deflector rod 14 moves towards and against the hanging noodle strands 12 and eventually carries an intermediate portion of the noodle strands 12 through the gap 18. When a sufficient amount of noodle strands 12 has been drawn through the gap 18, the deflector rod 14 stops and is withdrawn to set free the noodle strands 12. When sufficient amount of noodle strands 12 is supplied, the cutters 13 will operate to cut the noodle strands 12.

The instant when the deflector rod 14 starts to move, the distance for which the deflector rod 14 is to travel and the instant when the cutters 13 operate are all arranged such that cut apart noodle strands 12' are folded by the deflector rod 14 roughly right at the middle and that the portion of the so folded noodle strands 12' drawn through the gap 18 by the deflector rod 14 is sufficiently longer than the loose-end portion of the noodle strands 12' left behind the gap 18, as shown is FIG. 3.

After the cutters 13 have operated, they will immediately open up again to allow the continuous supply of the noodle strands 12 to pass through, the conveyor belt 11 delivering noodle strands 12 for the next noodle bundle to be prepared. It is understood that the unit weight of the noodle bundles to be prepared is determined by the length of the cut noodle strands, which is in turn dependent upon the speed of the conveyor belt 11 and the time interval between successive operations of the cutters 13.

As shown in FIG. 3, the cut noodle strands 12' are freely suspended from the operating device 15, being folded for the second time by the rod 17. As soon as the noodle strands 12' settle, the operating device 15 starts to rotate anti-clockwise, i.e. in a direction on the side of loose ends 12'a of the suspended noodle strands 12'.

FIGS. 4 to 6 show the situations in which the operating device 15 has been rotated for 90°, 180°, and 270°, respectively, whereby the doubly-folded noodle strands 12' are gradually wound onto the blade 16 and rod 17. Depending on the length of the noodle strands 12' and width W across the blade 16 and rod 17, the length of the depending portion of the doubly folded noodle strands 12' from the side of the blade 16 shown in FIG. 6 is less than the width W. Immediately when the operating device 15 reaches this position, a carriage 21 will move horizontally under the operating device 15 so as to fold the depending noodle strand portion up, as shown in FIG. 7. This step completes the folding of the noodle strands 12' which is afterwards left on the carriage 21 as shown in FIG. 8 upon withdrawal of the blade 16 and rod 17 behind the disk 20. The carriage 21 delivers the resulting noodle bundle to the next station for further processing, such as deep-frying or packaging.

The noodle strands 12' are initially suspended from the operating device 15 with the loose end 12'a sufficiently above bend end 12'b so that the loose end 12'a is located within the resulting noodle bundle, covered by the bend end 12'b, whereby the noodle strands become less vulnerable to breaking during handling.

It is envisaged that if the noodle strands 12' is sufficiently longer, the operating device 15 can be rotated for further 180° in order to fold the depending end portion shown in FIG. 6 right atop, thereby omitting the step of the carriage 21 moving in to complete the folding.

It is apparent that there is no material difference in function between the blade 16 and the rod 17, and therefore the operating device 15 can be placed in the upside-down position in the step shown in FIG. 3. FIG. 10 shows an alternative construction of the operating device in which two identical blades 22 are employed.

FIGS. 11 to 13 demonstrate another way to fold noodle strands 23 delivered by the conveyor belt (not shown), in that a deflector rod 24 moves against the suspending noodle strands 23 and push them aside until it is sufficiently displaced to enable the noodle strands 23 to stay on it by friction. At this time, the forthcoming noodle strands 23 will fall onto the trailing side of the deflector rod 24, and when the noodle strands 23 are cut, cut apart noodle strands 23' will eventually be supported by the deflector rod 24.

FIG. 14 and 15 show how the noodle strands 23' are put onto the operating device (designated generally as 25) shown in FIG. 10. The deflector rod 24 moves up through gap 26 between the blades 22, thereby passing the firstly folded noodle strands 23' through the operating device 25. The operating device 25 then rotates for 90° while the deflector rod 24 is moved laterally downwards and then withdrawn in order to fold the noodle strands 23' for the second time. The timing, operation and speed between the operating device 25 and the deflector rod 24 are such that the noodle strands 23' will not fall through the gap 26 and stay on the operating device 25. The operating device 25 then rotates in the opposite direction, i.e. on the side of the noodle strand loose ends, in order to fold the noodle strands 23' to form a bundle, in the same manner as described in relation to the first embodiment with reference to FIGS. 3 to 8.

In the described embodiments of the invention, although the noodle strands are folded only once before they are put onto the operating devices for folding or rolling up, in cases where the noodle strands required to form a bundle are too long for convenient handling they may be folded at least once before the method according to the invention is applied to them to form a bundle.

Depending on the thickness or the precise shape of the front part, i.e. the blade(s) and/or rod, of the operating devices, the noodle strands may be rolled up instead of being folded so as to form a bundle.

It is envisaged that the blade(s) and/or rod of the operating devices 15 and 25 may be provided with a rubbery surface or a surface pattern to enhance friction between the blade(s) and/or rod, and the noodle strands.

Various other modifications of and/or alterations to the described embodiments may be made without departing from the scope of the invention as specified in the appended claims.

What is claimed is:

1. Apparatus for forming noodle bundles comprising:
   means for conveying at least one length of noodle material along a path;
   means for deflecting the length of noodle material from said path to form a fold in the length of noodle material;
   means for severing the length of noodle material into noodles of preset length as the noodle material is conveyed along said path by said conveying means; and
   an operating device which receives a folded noodle from said deflecting means and from which said folded noodle is suspended at an intermediate position thereof, after being deflected by said deflecting means and severed from the length of noodle material by said severing means, thereby folding over said folded noodle again, said operating device further rotating about an axis to further fold or roll up said folded noodle to form a noodle bundle;

a portion of said operating device being movable along a direction of said axis in order to release said noodle bundle from said operating device.

2. The apparatus of claim 1, wherein said operating device further comprises a generally flat member against which said noodle bundle is drawn by movement of said portion of said operating device, in order to release said noodle bundle from said operating device.

3. The apparatus of claim 2, wherein said portion of said operating device comprises two parts forming a gap therebetween, wherein said folded noodle passes through said gap and is suspended from one of said parts.

4. Apparatus as claimed in claim 3, wherein said two parts are in the form of a plate and a co-planar rod.

5. The apparatus of claim 3, wherein said two parts comprise two co-planar rods.

6. An apparatus for forming flexible strand bundles comprising:

means for conveying at least one length of flexible strand material along a path;

means for deflecting said at least one length of flexible strand material from said path to form a fold in said at least one length of flexible strand material;

means for severing flexible strands from said at least one length of flexible strand material on said means for conveying;

and operating means, located on an opposite side of said flexible strands from said deflecting means, for receiving at least one folded flexible strand from said deflecting means and from which said at least one folded flexible strand is suspended at an intermediate position thereof, after being deflected by said deflecting means and severed from said at least one length of flexible material by said severing means, thereby folding said at least one folded flexible strand again, and for folding or rolling said at least one folded flexible strand into a flexible strand bundle.

7. The apparatus of claim 6, wherein said operating means further comprises a blade and a co-planar rod forming a gap therebetween, wherein said at least one folded flexible strand passes through said gap and is suspended from one of said blade and said co-planar rod.

8. The apparatus of claim 6, wherein said operating means further comprises two co-planar rods forming a gap therebetween, wherein said at least one folded flexible strand passes through said gap and is suspended from one of said co-planar rods.

9. The apparatus of claim 6, further comprising a carriage for horizontally passing beneath said operating means to further fold said flexible strands.

* * * * *